United States Patent [19]

Jahn et al.

[11] 4,173,357
[45] Nov. 6, 1979

[54] INSTALLATION FOR ADJUSTING THE HEIGHT OF THE UPPER ANCHORING OR DEFLECTION POINT FOR THE SHOULDER BELT OF A BELT SYSTEM

[75] Inventors: Walter Jahn, Sindelfingen; Jurgen Gimbel, Gechingen, both of Fed. Rep. of Germany

[73] Assignee: Daimler-Benz Aktiengesellschaft, Fed. Rep. of Germany

[21] Appl. No.: 803,384

[22] Filed: Jun. 3, 1977

[30] Foreign Application Priority Data
Jun. 5, 1976 [DE] Fed. Rep. of Germany ....... 2625417

[51] Int. Cl.² .......................................... B60R 21/00
[52] U.S. Cl. .................................. 280/808; 297/483
[58] Field of Search ............... 280/747, 746, 745, 744; 297/389

[56] References Cited

U.S. PATENT DOCUMENTS

| 3,923,321 | 12/1975 | Bauer et al. | 280/747 |
| 4,039,224 | 10/1977 | Bauer et al. | 280/745 |

Primary Examiner—Joseph F. Peters, Jr.
Assistant Examiner—Donn McGiehan
Attorney, Agent, or Firm—Craig and Antonelli

[57] ABSTRACT

An installation for the height adjustment of the upper anchoring or deflection point for the shoulder belt of a belt system in a vehicle, with individual seats adjustable in the horizontal and/or vertical direction; a transmission installation is thereby interconnected between each seat and the coordinated anchoring or deflection point which during an adjustment of the seat so displaces the anchoring or deflection point that a height position of the anchoring or deflection point is achieved which is favorable for the belt user in relation to the adjusted seat position.

22 Claims, 4 Drawing Figures

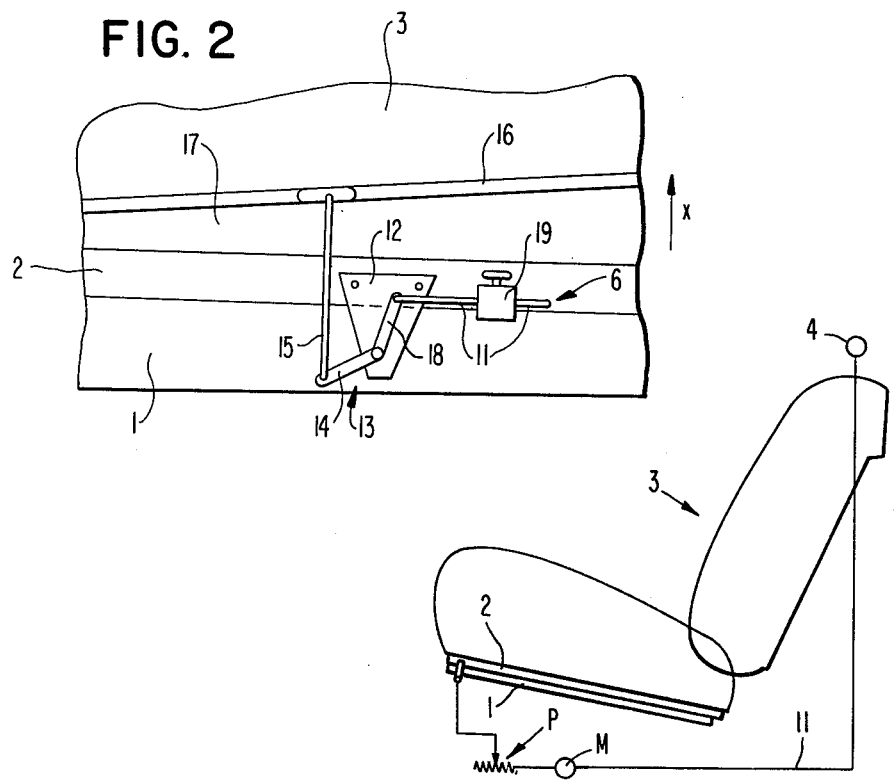
FIG. 2
FIG. 4
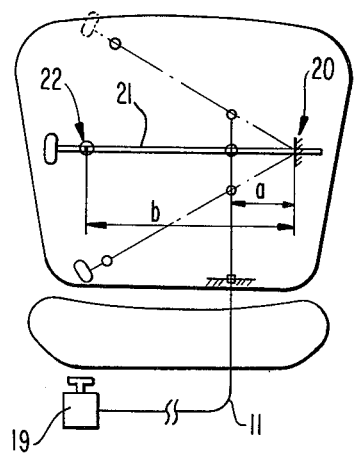
FIG. 3

INSTALLATION FOR ADJUSTING THE HEIGHT OF THE UPPER ANCHORING OR DEFLECTION POINT FOR THE SHOULDER BELT OF A BELT SYSTEM

The present invention relates to an installation for the height adjustment of the upper anchoring or deflection point for the shoulder belt of a belt system in a vehicle, especially in a motor vehicle, with individual seats adjustable in the horizontal and/or vertical direction.

By reason of the different sizes and proportions of the belt users, it is extraordinarily difficult to find a position of the upper anchoring point in static belts or of the deflection point for the shoulder belt of automatic belts, which is favorable for a large circle of persons. For that reason, one had recourse already previously to the provision of at least two fastening places arranged one above the other. This, however, provides only conditional help, since it is too complicated for most belt users, for example, for only a brief use of the belt, to adapt the fastening height to one's own requirements with the assistance of tools. Consequently, as a rule, the once-adjusted height remains during the operating period of the vehicle. This lacking adaptability is one of the reasons that frequently a belt use is declined together.

In order to obviate this shortcoming, it has already been proposed to arrange the anchoring or deflection point in a height-adjustable manner by means of a locking device. While a height adjustment can be achieved therewith without the use of tools, the handling nonetheless is frequently so complicated for untrained persons that an adjustment remains omitted.

The possibility to change the height of the anchoring or deflection point according to one's own feel, also entails a danger which was not quite well recognized heretofore. Thus, it may happen quite readily that the belt user selects a height position which provides him with a positive feel during the wearing of the belt, but which objectively considered is not at all suited to protect the passenger optimally in case of an impact.

It is the aim of the present invention to indicate an approach to adapt the position of the anchoring or deflection point far-reachingly automatically to the needs of as large as possible a circle of persons, taking into consideration the comfort and the best protection.

Consequently, an installation for the height adjustment of the upper anchoring or deflection point for the shoulder belt of a belt system in a vehicle, especially in a motor vehicle, with individual seats adjustable in the horizontal and/or vertical direction is proposed, whereby according to the present invention a transmission mechanism is interconnected between each seat and the coordinated anchoring or deflection point, which during an adjustment of the seat displaces the anchoring or deflection point in such a manner that a height location of the anchoring or deflection point is achieved which, in relation to the adjusted seat position, is favorable for the belt user.

In one preferred embodiment of the present invention, the transmission mechanism is adapted to be calibrated at least in one base position and the adjustment of the anchoring or deflection point takes place stepwise or steplessly, whereby the adjustment path thereof is in a predetermined relationship to that of the seat. As a result of the possibility to examine the installation according to the present invention in a predetermined position, also the assembly and installation operation can be considerably simplified. Whether a stepwise or stepless adjustment is selected depends on how the seat adjustment operates. Thus, as a rule, with the adjustment of the seat by means of an auxiliary force, also a stepless adjustment of the anchoring or deflection point will be contemplated. The adjustment paths of the seat and of the pivotal connecting point of the belt are thereby in a predetermined relationship, which may change in relation to the overall adjusting path.

It is possible that the transmission mechanism consists of an electric transmitter, for example, in the form of a potentiometer and of an adjusting motor.

In another embodiment of the present invention, the transmission mechanism includes on the side of the seat a transmitter in the form of, for example, a hydraulic cylinder, which cooperates with a receiver or follower cylinder connected with the anchoring or deflection point. However, also pneumatically operating installations can be used in the present invention, for example, with the use of vacuum-adjusting elements.

Additionally, it may be advantageous to construct the transmission mechanism as flexible connection which transmits both tensional and also compression forces.

The transmission installations thereby need not be so constructed that they are capable of absorbing the high forces which, for example, become effective in case of an impact. Instead, the adjusting installation may be so constructed that an adjustment is readily possible during the normal operation whereas with a larger load at the belt, an automatic locking of the deflection or anchoring point takes place, for example, by a conventional detent mechanism.

In another preferred embodiment according to the present invention, a two-armed lever is mounted at the longitudinally adjustable part of the seat, whose one lever arm includes an adjusting rod responding to a seat height change and whose other lever arm receives one end of the transmission mechanism. If in this case the seat is, for example, lowered, then also the height of the anchoring or deflection point is decreased.

In order that also persons can be encompassed which are classified as so-called "seat giants" or "seat dwarfs", a selection device may be provided in which, starting from a center position, a change of the height location of the anchoring or deflection point is attainable without simultaneous adjustment of the seat.

Accordingly, it is an object of the present invention to provide an installation for the height adjustment of the upper anchoring or deflection point for the shoulder belt of a belt system which avoids by simple means the aforementioned shortcomings and drawbacks encountered in the prior art.

Another object of the present invention resides in an installation for the height adjustment of the upper anchoring or deflection point for the shoulder belt of a belt system which is simple in construction and obviates the need for complicated adjustments by the user.

A further object of the present invention resides in an installation for the height adjustment of the upper anchoring or deflection point for the shoulder belt of a belt system which can be used by a large circle of persons without the danger of possible misadjustments.

Still a further object of the present invention resides in an installation for the height adjustment of the upper anchoring or deflection point for the shoulder belt of a belt system which assures optimum protection for the passenger in case of an impact, yet fully satisfies all requirements as regards comfort for the user.

Another object of the present invention resides in an installation for the height adjustment of the upper anchoring or deflection point for the shoulder belt of a belt system of a motor vehicle which insures the most favorable height position thereof for the belt user, taking into consideration the adjustment of the seat.

These and other objects, features and advantages of the present invention will become more apparent from the following description when taken in connection with the accompanying drawings which show, for purposes of illustration only, several embodiments in accordance with the present invention, and wherein:

FIG. 2 is a schematic partial side elevational view of a mechanically operating transmitter of the transmitting device in accordance with the present invention with simultaneous detection of a seat height adjustment;

Figure 1:
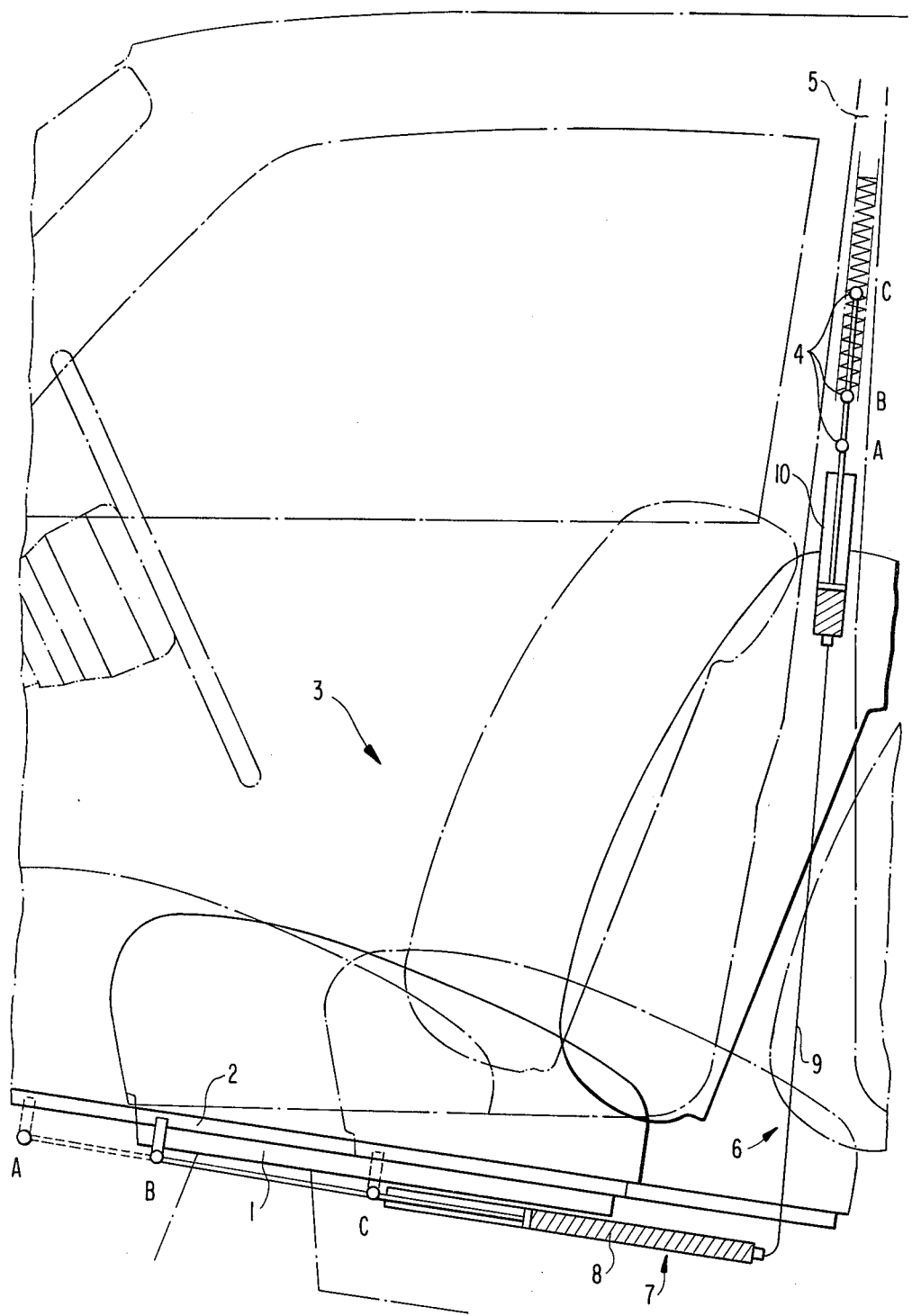
FIG. 1 is a schematic side elevational view of an overall arrangement of the installation for the height adjustment of the upper anchoring or deflection point in accordance with the present invention in a passenger motor vehicle.

FIG. 3 is a schematic plan view of a seat with a mechanically operating transmitter (Bowden cable) of the transmitting device in accordance with the present invention with a selection possibility of the transmission ratio between height adjustment and seat adjustment in accordance with the present invention; and FIG. 4 is a schematic partial side elevational view of an electrically operating transmitter of the transmitting device in accordance with the present invention.

Referring now to the drawings wherein like reference numerals are used throughout the various views to designate like parts, and more particularly to FIG. 1, a safety belt system (not shown) of otherwise conventional construction is coordinated to a seat displaceable in the vehicle longitudinal direction within rising seat guide rails 1 and 2, whereby the deflection point 4 of the shoulder belt is arranged within the area of the center column 5 of the vehicle. A transmission mechanism generally designated by reference numeral 6 is interconnected between the seat 3 and the deflection point 4, which is pivotally connected on the side of the seat at the guide rail 2 secured at the seat and which includes as transmitter, generally designated by reference numeral 7, a hydraulic cylinder 8 which is connected by way of a line 9 with a receiver or follower cylinder 10. The deflection point 4 is provided at the follower cylinder 10.

If the seat 3 illustrated in full lines is so displaced that the point of pivotal connection of the transmission mechanism 6 on the side of the seat travels from the position B to the position A or C, then the deflection point 4 which may be, for example, spring-loaded, is displaced into the coordinated positions at the ratio of the piston translation of the two cylinders. The translation or transmission ratio is thereby so selected that as large as possible a circle of persons will be covered by the displacement of the point of pivotal connection 4, which is correct with respect to the body of the user, in dependence on the position of the seat 3.

The transmission side of the transmission mechanism 6, illustrated in FIG. 2 only partly, which includes a Bowden cable 11 as transmission means that transmits both tensional and also compression forces, is provided with a mounting bracket 12 secured at the guide rail 2, that pivotally receives a two-armed lever 13. One lever arm 14 of the two-armed lever 13 receives an adjusting rod 15, i.e., is pivotally connected therewith, which engages, for example, in a guidance 16 in the subframe 17 of the seat 3 and also responds, when after reaching the desired longitudinal displacement, a height adjustment or raising of the seat 3 takes place by conventional means (not shown), for example, in the direction of arrow "X". Since the other lever arm 18 of the lever 13 is pivotally connected with the Bowden cable 11, also the deflection point is displaced upwardly during the displacement movement in the direction of the arrow "X" in a manner not illustrated in detail in this figure.

In order to be able to utilize the transmission installation 6 usefully also for the circle of persons that consists of so-called "seat giants" and "seat dwarfs", a selection device 19 is interconnected in the course of the Bowden cable 11, by means of which a matched change of the height position of the deflection point is possible without change of the seat position.

The illustration according to FIG. 3 shows a simplified plan view of a seat whose adjusting movements in the vehicle longitudinal direction are transmitted by way of the Bowden cable 11. An adjusting rod 21 is pivotally supported in a pivot point 20 fixed at the vehicle, whereby the pivot movement takes place during a seat longitudinal displacement by an entrainment device 22 of conventional type, not illustrated in detail, for example, in the form of a template or cam guidance or the like. The point of pivotal connection thereby includes a constant lever length "b" whereas the lever length "a" is changeable for attaining a different relationship between seat longitudinal adjustment and height adjustment of the fastening or deflection point.

As shown in FIG. 4, the transmission mechanism may be an electrical transmitter and include a conventional circuit having a potentiometer generally designated by the reference character P operatively connected to the seat 3 and an adjusting motor M. Movement of the seat 3 so as to adjust the same would result in a shifting of the potentiometer P, thereby resulting in an activation of the adjusting motor M which, in turn, would adjust the Bowden cable 11.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An installation for the height adjustment of a point consisting of one of upper anchoring and deflection point, for a shoulder belt of a belt system in a vehicle, including individual seat means adjustable in at least one of two directions consisting of horizontal and vertical direction, characterized by transmission means operatively interconnected between a respective seat means and said point coordinated to the seat means, said transmission means being operable to displace said point during an adjustment of the seat means such that a height location of said point is realized which is favorable for a belt user in relation to the respective adjusted seat position.

2. An installation according to claim 1, characterized in that the transmission means is operable to be calibrated at least in one base position.

3. An installation according to claim 2, characterized in that the adjustment of the point takes place in a stepwise manner.

4. An installation according to claim 2, characterized in that the adjustment of said point takes place in a stepless manner.

5. An installation according to claim 2, characterized in that an adjusting path of said point to that of the seat means is at a predetermined ratio.

6. An installation according to claim 5, characterized in that the transmission means includes an electrical transmitter mechanism.

7. An installation according to claim 6, characterized in that the electrical transmitter mechanism includes a potentiometer and an adjusting motor operatively connected with said potentiometer.

8. An installation according to claim 5, characterized in that the transmission means is arranged on a side of the seat means, said transmission means includes a hydraulic transmitter and a hydraulic follower operatively connected with said hydraulic transmitter and said point.

9. An installation according to claim 8, characterized in that the hydraulic transmitter is a hydraulic cylinder and a follower cylinder in communication with the hydraulic cylinder.

10. An installation according to claim 5, characterized in that the transmission means includes a flexible connection means for transmitting both tensional and compression forces.

11. An installation according to claim 5, characterized in that a two-armed lever means is supported at the horizontally longitudinally adjustable part of the seat means, one lever arm of said two-armed lever means includes an adjusting rod responding to a seat height adjustment and the other lever arm of the two-armed lever means is operatively connected with one end of the transmission means.

12. An installation according to claim 8, characterized in that a selecting means is provided for enabling an adjustment of the height position of said point starting from a center position without simultaneous adjustment of the seat means.

13. An installation according to claim 1, characterized in that the adjustment of the point takes place in a stepwise manner.

14. An installation according to claim 1, characterized in that the adjustment of said point takes place in a stepless manner.

15. An installation according to claim 1, characterized in that an adjusting path of said point to that of the seat means is at a predetermined ratio.

16. An installation according to claim 1, characterized in that the transmission means includes an electrical transmitter mechanism.

17. An installation according to claim 16, characterized in that the electrical transmitter mechanism includes a potentiometer and an adjusting motor operatively connected with said potentiometer.

18. An installation according to claim 1, characterized in that the transmission means is arranged on a side of the seat means, said transmission means includes a hydraulic transmitter and a hydraulic follower operatively connected with said hydraulic transmitter and said point.

19. An installation according to claim 1, characterized in that the transmission means includes a flexible connection means for transmitting both tensional and compression forces.

20. An installation according to claim 1, characterized in that a two-armed lever means is supported at the longitudinally adjustable part of the seat means, one lever arm of said two-armed lever means includes an adjusting rod responding to a seat height adjustment and the other lever arm of the two-armed lever means is operatively connected with one end of the transmission means.

21. An installation according to claim 20, characterized in that a selecting means is provided for enabling an adjustment of the height position of said point starting from a center position without simultaneous adjustment of the seat means.

22. An installation according to claim 1, characterized in that a selecting means is provided for enabling an adjustment of the height position of said point starting from a center position without simultaneous adjustment of the seat means.

* * * * *